United States Patent [19]

Lee

[11] Patent Number: 4,794,585
[45] Date of Patent: Dec. 27, 1988

[54] OPTICAL HEAD HAVING A HOLOGRAM LENS AND POLARIZERS FOR USE WITH MAGNETO-OPTIC MEDIUM

[76] Inventor: Wai-Hon Lee, 10332 Noel Ave., Cupertino, Calif. 95014

[21] Appl. No.: 938,085

[22] Filed: Dec. 4, 1986

Related U.S. Application Data

[63] Continuation-in-part of Ser. No. 860,154, May 6, 1986, Pat. No. 4,731,772.

[51] Int. Cl.$^4$ ............................................. G11B 7/12
[52] U.S. Cl. .................................... 369/112; 369/45; 369/46; 350/162.21
[58] Field of Search ...................... 350/162.11, 162.15, 350/162.17, 162.19, 162.21, 404; 369/44, 45, 46, 109, 112, 121, 122; 250/201 DF

[56] References Cited

U.S. PATENT DOCUMENTS

| | | | |
|---|---|---|---|
| 3,628,849 | 12/1971 | Malabry et al. | 350/162.21 |
| 4,143,402 | 3/1979 | Bricot et al. | 369/45 |
| 4,216,357 | 8/1980 | Iwasaki et al. | 369/45 |
| 4,241,999 | 12/1980 | Pouey | 350/162.21 |
| 4,253,723 | 3/1981 | Kojima et al. | 369/45 |
| 4,458,980 | 7/1984 | Ohki et al. | 369/45 |
| 4,624,526 | 11/1986 | Tsukai et al. | 369/112 |

Primary Examiner—Donald McElheny, Jr.
Attorney, Agent, or Firm—Townsend & Townsend

[57] ABSTRACT

An optical head which uses a single diffraction grating to eliminate the need for both a beam-splitter and a biprism lens. This invention allows the placement of all the elements except the photodetector along a single optical axis with the photodetector immediately adjacent to the optical axis. This arrangement reduces alignment problems and vibrational errors. A semiconductor laser is provided which produces a laser beam which impinges upon a movable objective lens. The objective lens focuses the laser beam onto an information medium. A holographic diffraction grating is placed between the laser and the objective lens. The diffracted beams on the forward path from the laser to the objective lens are not used, but on the return path, one of the diffracted beams is focused onto a photodetector. In a first embodiment, the photodetector is adjacent the semiconductor laser in substantially the same plane. In a second embodiment, an additional lens is used to produce an additional focus point intermediate the laser and the medium, with the photodetector being in substantially the same plane as this additional focal point. By using an appropriate fringe pattern for the hologram lens, the return beam can be focused on the photodetector as desired.

12 Claims, 10 Drawing Sheets

OPTICAL HEAD HAVING A HOLOGRAM LENS AND POLARIZERS FOR USE WITH MAGNETO-OPTIC MEDIUM

This is a continuation-in-part of application Ser. No. 860,154 filed May 6, 1986 now U.S. Pat. No. 4,731,772.

BACKGROUND

The present invention relates to optical heads for use in data recording and retrieval systems.

Optical heads produce a focused beam of light on a medium containing information and detect the light reflected from the medium to determine the information content of the medium. Mechanisms for maintaining the focus and tracking of the optical head are required. With the recent advances in semiconductor lasers, there has been an increasing use of these lasers in data retrieval and recording systems. The compact audio disc player is a significant example of how lasers are used in playing back prerecorded music, which is a form of information. The concept of the compact audio disc player or the long play video disc player can be applied to the storage of data for a large computer network, mini computers or even personal computers.

When lasers are employed in these devices, the light emitted by the lasers must be controlled by appropriate optical components to produce a very small spot of light on the medium surface. Light reflected off of the medium is projected back to a detector from which recorded information and other signals relating to the status of the focus and tracking can be derived. Some examples of patents covering optical systems for such applications are U.S. Pat. Nos. 4,486,791, 4,193,091, 4,135,083, 4,034,403, 3,969,573, 4,057,833, 3,962,720, West German Pat. No. 2,501,124 and U.S. Pat. No. 4,198,657.

In some compact disc players the optical unit is separated into two parts. The first part contains a laser and a collimating lens to produce a nearly collimated (parallel) laser beam. It also contains a beam-splitter to direct the return light reflected off the medium to a detector reading the recorded information. The second part contains a focusing objective lens and a mechanism for moving it up and down so that the focus spot is maintained on the medium surface.

In another version of these devices, a laser beam from the laser diode is directly imaged onto the medium by an obeective lens without the use of a collimater. In the return path, the light is imaged on a detector by a beam-splitter.

Figure 1:
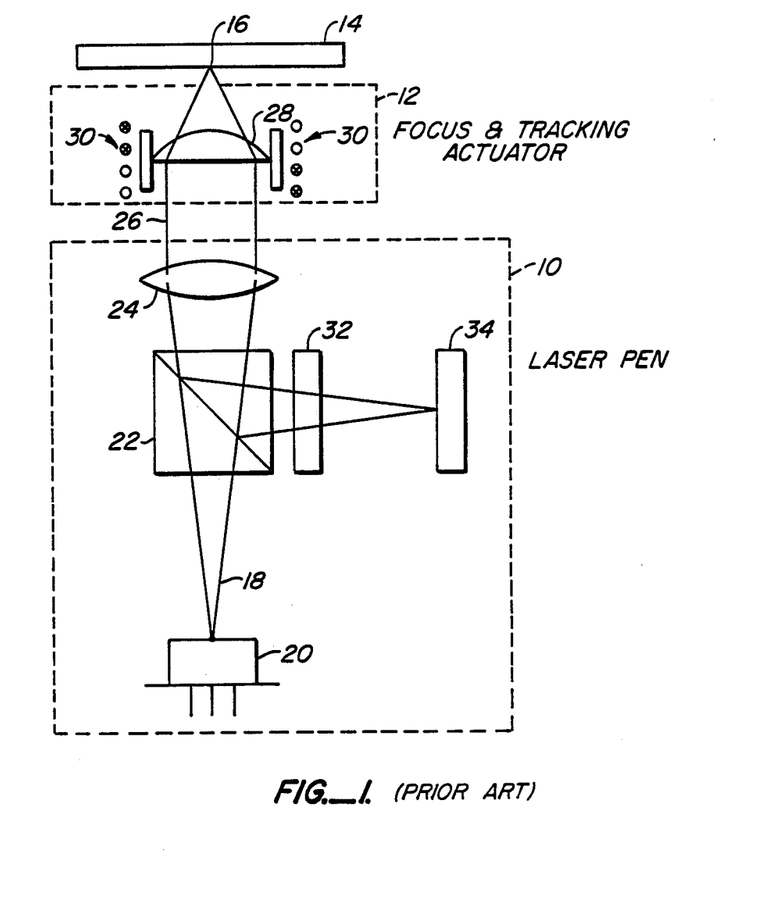
FIG. 1 is a diagram of a prior art optical head using a collimating lens.

FIG. 1 shows one embodiment of a prior art optical read head for a compact disc player. The head consists of a laser pen 10 and a focusing and tracking actuator 12. The laser beam is focused on an information medium 14 at a spot 16. A laser beam 18 in the shape of an elliptical cone is emitted from the semiconductor laser diode 20. Laser beam 18 passes unchanged through a beam-splitter 22 to a collimating lens 24. Collimating lens 24 produces a substantially parallel beam of light 26 which impinges upon an objective lens 28. Objective lens 28 focuses beam 26 onto medium 14 at spot 16. The focusing of lens 28 is accomplished through the use of a magnetic coil 30 which moves objective lens 28 up and down with respect to medium 14. In addition, a tracking actuator 12 may move objective lens 28 radially along the direction of medium 14, which is typically a disc.

When the laser beam is returned or reflected off of medium 14, part of the beam is reflected by beam-splitter 22 and passes through a biprism or cylindrical lens 32 to a photodetector 34. Lens 32 produces a pattern on photodetector 34 which varies according to the focus of spot 16. Thus, when detector 34 detects a variation from the ideal focus, appropriate electrical signals can be supplied to coil 30 to move objective lens 28 to the correct position. This mechanism is somewhat complicated and requires a large number of elements which must be precisely aligned relative to each other.

Figure 2:
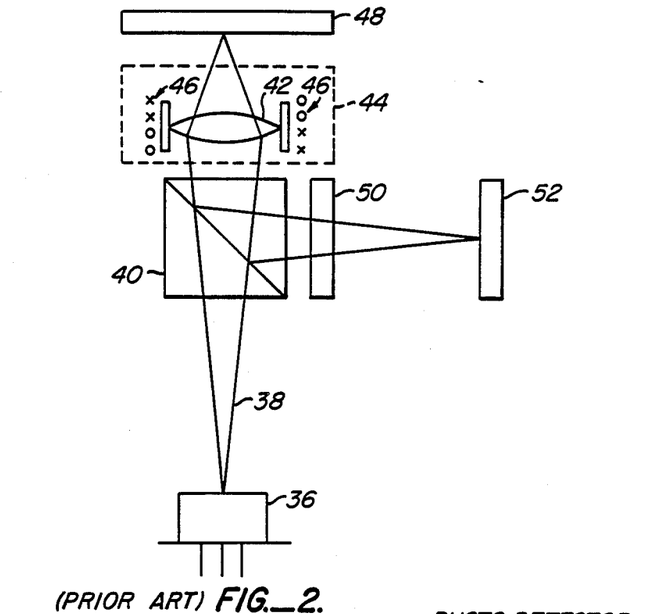
FIG. 2 is a diagram of a prior art optical head without a collimating lens.

FIG. 2 illustrates another embodiment of prior art optical head. A laser diode 36 emits a diverging laser beam 38 which passes through a beam-splitter 40 directly onto an objective lens 42. Again, lens 42 is mounted in a focusing and tracking actuator 44 which includes a coil 46. The beam impinges upon a medium 48 and a portion of the reflected beam is directed by beam-sllitter 40 through biprism 50 onto photodetector 52. This embodiment eliminates the need for collimating lens 24 of FIG. 1, but requires that the laser pen and focus and tracking actuator of FIG. 1 be combined in one unit because of the need to precisely align objective lens 42 and beam-splitter 40. Thus, the embodiment of FIG. 2 cannot be produced modularly as can the embodiment of FIG. 1. In the embodiment of FIG. 1, the use of collimater lens 24 obviates the need for precise alignment of focusing and tracking actuator 12 and laser pen 10. Thus, the disadvantage of the embodiment of FIG. 2 is that in the event of a malfunction the entire unit must be repaired or replaced.

Figure 3:
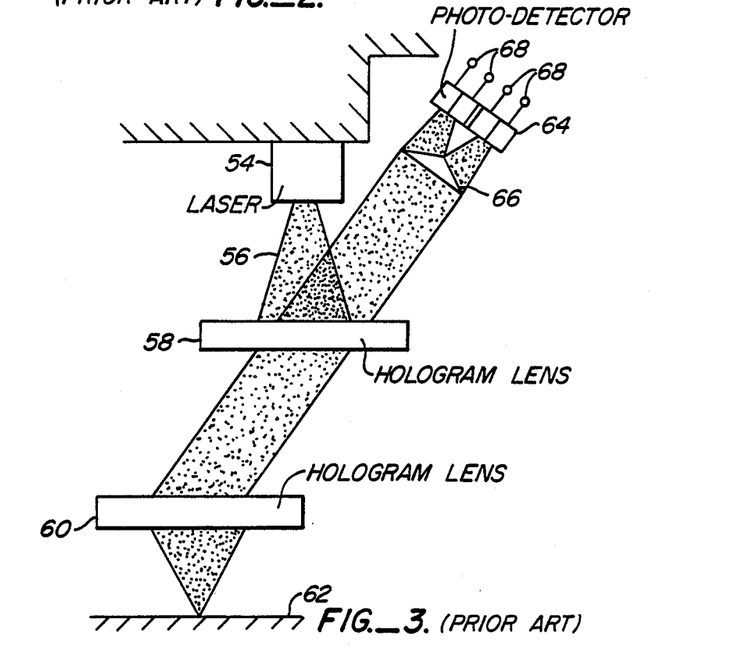
FIG. 3 is a diagram of a prior art optical head using a pair of hologram lenses.

A third prior art optical head utilizing a pai of hologram lenses is shown in FIG. 3. A hologram lens is a diffraction grating which was produced using holographic methods. A diffraction grating is a grating having a series of slits so that it diffracts light shined upon it. Light impinging on a diffraction grating will produce a series of diffracted beams at different angles from the central axis of the impinging light beam. The value of the angles of diffraction depend upon the wavelength of the light and the spacing of the grating. Diffraction gratings can be created mechanically, but there is a limit to the size of the spacing that can be achieved. A hologram lens is a diffraction grating created by the use of two interfering coherent laser beams in such a manner that the beams form a suitable angle relative to each other and a diffraction grating corresponding to the resulting interference pattern is formed. This interference pattern is projected onto a substrate, such as glass coated with photoresist. Upon development of the photoresist, unexposed areas (negative photoresit) or exposed areas (positive photoresist) are removed, leaving a number of parallel grooves. Vacuum deposition of a suitable metal on the grooves provides diffraction grating of the reflection type, comprising a number of equidistant parallel lines. A discussion of the formation of a hologram lens according to various techniques is set forth in U.S. Pat. No. 4,560,249.

The optical head of FIG. 3 uses a laser diode 54 to emit a laser beam 56. Laser beam 56 impinges upon a hologram lens 58, and one of the diffracted beams from hologram lens 58 impinges upon hologram lens 60. The diffracted beam from lens 58 to lens 60 is a parallel beam of light, and thus hologram lens 58 replaces the collimating lens of FIG. 1. This beam hits hologram lens 60 at an angle, causing hologram lens 60 to emit a focused beam onto a medium 62. Thus, hologram lens 60 replaces objective lens of FIGS. 1 and 2. On the return path, the undiffracted, collimated beam of light passing through hologram lens 58 impinges upon a photodetector 64 after passing through a biprism or wedge 66. The collimation of the return beam allows a photodetector 64 to be placed a different distance from medium 62 than laser 54. Photodetector 64 includes four separate photodetectors 68. Biprism 66 splits the laser beam to create two focused beams of light which fall on different ones of detectors 68. A change in focus will cause these beams of light to move from one of detectors 68 to another, thereby enabling the detection of an out-of-focus condition. The apparatus of FIG. 3 is disclosed in U.S. Pat. No. 4,458,980.

An alternative to a biprism lens is a cylindrical lens which is polished with two separate curvatures to produce an astigmatic beam. The astigmatic beam is focused on the center of a four quadrant photodetector and will be a circle when in focus. When out of focus in one direction, it will be an elliptical beam at a first angle and thus two of the photodetectors will detect more light than the other two, indicating a focus error. When out of focus in the other direction, an elliptical beam at a different angle is produced, which can also be detected.

In addition to correcting for focus error, or the distance from the objective lens to the medium, the optical head must also track the data. The data is typically written onto a series of concentric or spiraling grooves on a disc. The grooves are very narrow and are spaced by approximately 1.6 microns to allow the placement of pits having a size on the order of 1 micron. Data is typically stored in the form of a combination of pits and "lands," where lands are the area between the recessed pits. The pits serve to scatter the laser beam while the lands reflect it. A change in the amount ofrreflected light indicates a transition from a pit to a land. Often, it is these transitions which are used to represent bits of data rather than the pits and lands themselves.

Because the thin groove which the pits and lands are centered on is separated from other grooves by a distance of the same order of magnitude as the laser beam diameter, a diffraction effect is produced on the beam reflected back to the detector. This diffraction effect produces three beams which partially overlap. If the beam moves off the groove to the area between grooves, interferences of the overlapping beams causes the right and left half of the pattern to alternate in brightness. By using multiple photodetectors, this change in brightness can be monitored to detect tracking errors and produce a feedback signal to put the beam back on track.

Another method for tracking is the use of a diffraction grating in front of the laser to split the laser beam into three beams before it hits the medium. The center tracking beam is focused on the track with the left and right sides being on the left and right sides of the track. These three beams are reflected back and split off by a beam-splitter to a separate set of photodiodes which detect the intensity of the two weaker beams. When they are of different intensities, the error signal activates a servo mechanism that moves the optical head to correct for the error.

Another type of medium uses thermal magnetic recording to provide an erasing and rewriting capability. The principle of thermal magnetic recording is based on a characteristic of certain ferromagnetic material. When the temperature of the material is raised above the Currie temperature, the magnetization of the material can be affected by a small magnetic field. This principle is used for thermal magneto-optics data storage where laser beam is focused on the recording medium to raise the temperature of the medium above the Currie temperature. A small electro-magnet is placed on the other side of the meiium to create a magnetic field near the medium to change the magnetization of the medium. To retrieve information from the medium a laser beam is again focused on the medium but at lower power. Depending on the magnetization of the medium, the polarization of the beam reflected off the medium is either unchanged or rotated by about 0.4 degree. A polarizer inserted before a photodetector allows the detector to sense these two different states of polarization of the returned beam. One method of erasing the recorded information is to first reverse the direction of magnetization of the electro-magnet and then apply a focused laser beam to raise the temperature of the medium to above the Currie temperature to uniformly magnetize the medium in one direction.

To use the above principle in optical data storage systems an optical head is needed to produce a focused laser beam on the thermal magnetic medium. Moreover, a polarizer is needed to permit the detector to read the information recorded on the medium.

Polarizers needed for the thermal magnetic optical heads are available commercially in two forms. One is a sheet type polarizer based on dichroism, which is the selective absorption of one plane of polarization in preference to the other orthogonal polarization during transmission through a material. Sheet polarizers are manufactured from organic materials which have been imbedded into a plastic sheet. The sheet is stretched, thereby aligning the molecules and causing them to be birefringent, and then dyed with a pigment. The dye molecules selectively attach themselves to the aligned polymer molecules, with the result that absorption is very high in one plane and relatively weak in the other. The transmitted light is then linearly olarized. The optical quality of the sheet type polarizers is rather low. They are used mostly for low power and visual applications.

Another type of polarizer is based on the use of wire grid structures to separate the two orthogonal polarizations. When light radiation is incident on an array of parallel reflective stripes whose spacing is on the order of or less than the wavelength of the radiation, the radiation whose electric vector is perpendicular to the direction of the array is reflected. The result is that the transmitted radiation is largely linearly polarized. The disadvantage of both types of polarizers is that their light efficiencies are typically less than 30%.

There is thus a need for a simpler optical head with a more efficient polarizer.

SUMMARY OF THE INVENTION

The present invention is an improved optical head which uses a single diffraction grating to eliminate the need for both a beam-splitter and a biprism lens. This invention allows the placement of all the elements except the photodetector along a single optical axis with the photodetector being placed immediately adjacent to this optical axis. This arrangement reduces alignment problems and vibrational errors. A semiconductor laser is provided which produces a laser beam which impinges upon a movable objective lens. The objective lens focuses the laser beam onto an information medium. A diffraction grating, which may be holographic, is placed between the laser and the objective lens. The diffracted beams on the forward path from the laser to the objective lens are not used, but on the return path, one of the diffracted beams is focused onto a photodetector.

In a first embodiment, the photodetector is adjacent the semiconductor laser in substantially the same plane (within 2 mm). In a second embodiment, a additional lens is used to produce an additional focus point intereediate the laser and the medium, with the photodetector being in substantially the same plane as this additional focal point. By using an appropriate pattern for the hologram lens, the focus point for the return laser beam can be positioned in front of the laser or the additional focus point. This simplifies construction since the photodetector cannot easily be fabricated in the same plane as the laser face.

Preferably, the photodetector is a plurality of photodetectors having a center within five millimeters of the semiconductor laser. The semiconductor laser and the photodetector may be mounted on the same heat sink, thus ensuring that the photodetector will move in the same amount and direction as the laser as a result of any vibration, thus improving the accuracy of the optical head.

A collimating lens may be included, or a mirror may be used to allow the laser and photodetector to be mounted at an angle to the axis of the objective lens and the hologram lens. Focusing may be accomplished by variations in the grating pattern of the hologram lens. For instance, an astigmatic image may be produced by having the spacing increase from one side to the other of the hologram lens. A four-quadrant photodetector can then determine whether tee beam is in focus and tracking by comparing the amount of light impinging on the separate quadrant detectors. Alternately, the hologram lens may have a grating with a first spacial frequency (spacing distance) on a first half of the lens and second spacial frequency on a second half of the lens. This will produce two diffraction beams, one from each side, which are both imaged on four parallel photodetectors. By monitoring the movement of the two beams among the four photodetectors, the focus and tracking of the beam can be monitored.

For applications utilizing a thermal magnetic medium, a polarizer is placed in front of each photodetector to enable detection of changes in polarization on the medium. The polarizer is preferably formed from a holographic grating with a line spacing less than the wavelength of the laser beam used for reading and writing. A single holographic grating can be used as the polarizer, with the grating having a central portion without lines for allowing the passage of the source beam and having lines on respective sides which are orthogonal to each other to present orthogonal polarizations to a pair of photodetectors. A method for making such a polarizer is also disclosed.

The present invention thus provides a simple optical head with less parts than the prior art which is less susceptible to error due to vibration than the prior art optical heads. The beam-splitter and biprism lens of the prior art are both replaced by the single hologram lens, allowing the placement of all of the elements of the optical head except the photodetector along a single optical axis.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 4:
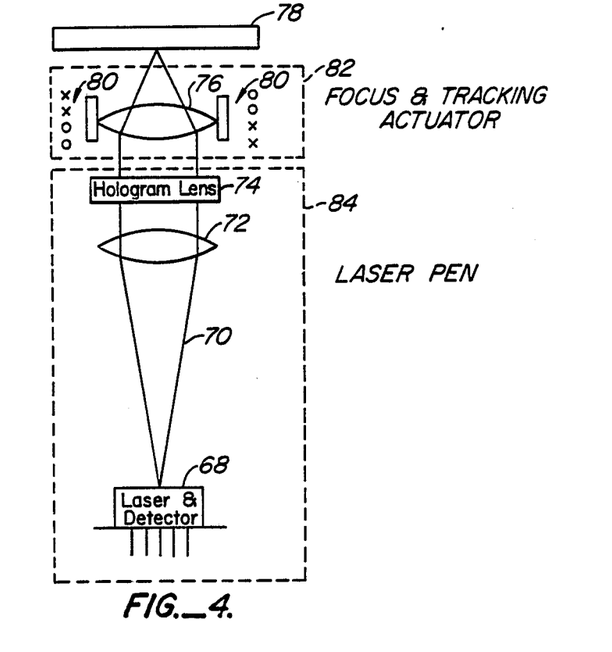
FIG. 4 is a diagram of a preferred embodiment of an optical head according to the present invention having a laser diode and a photodetector immediately next to each other.

A first embodiment of an optical head according to the present invention is shown in FIG. 4. This optical head arrangement can be used for different recording mediums, such as a thermal-magnetic medium or a medium using lands and pits. A semiconductor laser and detector 68 radiates a laser beam 70 to a collimating lens 72. The collimated beam passes through a hologram lens 74 to an objective lens 76. Hologram lens 74 can also be put between semiconductor laser and detector 68 and the collimating lens 72. Objective lens 76 focuses the beam onto a medium 78. Objective lens 76 can be moved by a coil 80 in a focusing and tracking actuator 82. Semiconductor laser and detector 68, collimating lens 72 and hologram lens 74 form a laser pen 84 portion of the optical head.

Figure 5:
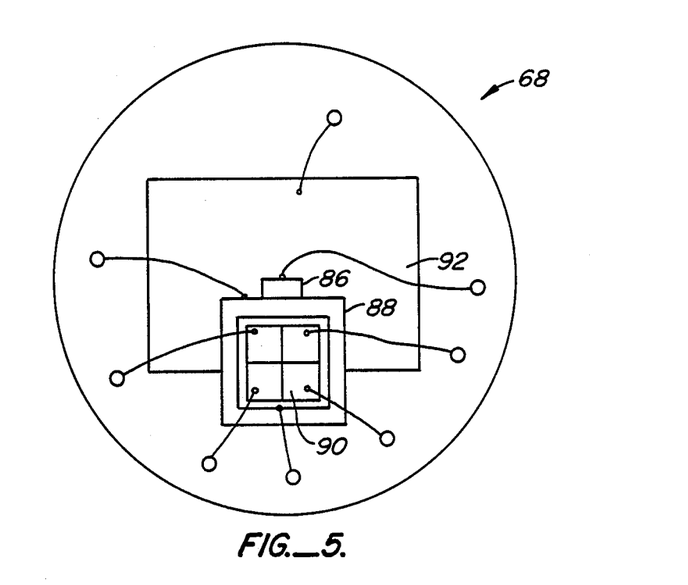
FIG. 5 is a front plan view of the semiconductor laser and photodetector of FIG. 4.

FIG. 5 shows a front view of the semiconductor laser and photodetector 68. A semiconductor laser 86 is mounted on a heat sink 88. A four-quadrant photodetector 90 is mounted on the face of heat sink 88. A photodetector 92 is located behind semiconductor laser 86 to measure the light emitted from the semiconductor laser. Photodetector 92 is at an angle so that it does not reflect light back into semiconductor laser 86. Four-quadrant detector 90 is preferably within 5 millimeters of semiconductor laser 86 and is preferably within 2 mm of the same plane as laser 86. A typical manufacturing process results in a photodetector with a thickness of 0.25 to 0.5 mm, and thus a separation of this amount between the photodetector surface and the laser diode face. This separation can be compensated for with a hologram lens combining an astigmatic wavefront for focus error generation and a spherical wavefront similar to a conventional lens. This should place the detector within the focus error range of the optical head. A more detailed description of a preferred embodiment of semiconductor laser and photodetector 68 is presented in copending application Serial No. 858,411, filed May 1, 1986.

In operation, laser beam 70 from semiconductor laser 86 is collimated or made parallel by collimating lens 72. This collimated beam passes through hologram lens 74 to produce a zero order diffracted beam and a number of higher order diffracted beams. The zero order diffracted beam is the one which continues on the same path, and not at an angle, and is the only beam used in the forward light path of the optical head. This beam is focused on medium 78 by objective lens 76 which can be moved with coil 80.

On the return path, the beam again hits hologram lens 74 producing zero and higher order diffracted beams. The zero order beam is returned to the laser and is not used for detection. (Some prior art systems utilize the change in power of the laser due to the reflected beam to measure the intensity of the reflected beam. These systems, however, cannot do focusing and tracking in this manner.) The reflected beam on the return path also produces higher order diffracted beams from holographic lens 74. One of these higher order diffracted beams is imaged onto photodetector 90. Preferably, this is the first order diffracted beam which is diffracted by an angle of approximately 10 degrees. This structure has the advantage of having the semiconductor laser and photodetector mounted on the same mechanical structure. Thus, motion of this mechanical unit has little effect on the signals received by the optical head because the detector will move in the same amount and direction as the beam will move due to movement of the semiconductor laser.

The embodiment of FIG. 4 is modular in that laser pen 84 can be replaced separately from focusing and tracking actuator 82. In fact, the focusing and tracking actuator of FIG. 4 is the aame as the focusing and tracking actuator of the prior art.

Figure 6:
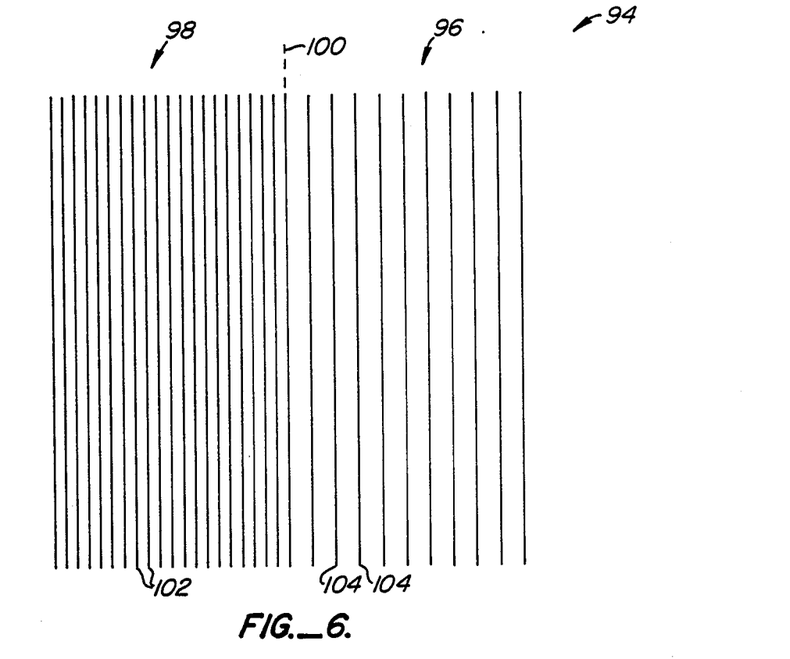
FIG. 6 is a diagram of the grating of a hologram lens according to the present invention having different spacing on each half.
Figure 7:
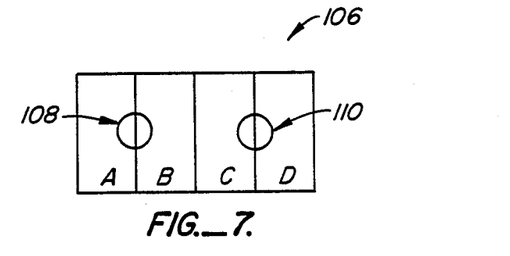
FIGS. 7 and 7A are diagrams of an image from the hologram lens of FIG. 5 projected on four parallel photodetectors according to the present invention.

In addition to diffracting the beam of light to move it slightly so that it will impinge upon the photodetector, hologram lens 74 can also be constructed to perform a tracking and focusing function in conjunction with the phooodetector. FIG. 6 illustrates one construction of holographic lens 74 which can be used in conjunction with four parallel photodetectors as shown in FIG. 7. FIG. 6 shows a portion of a hologram lens 94 having a first half 96 and a second half 98 divided by a centerline 100. The spacing between lines or stripes 102 on side 98 of hologram lens 94 is less than the spacing between lines 104 on side 96. Side 98 thus has a grating with a spacial frequency $f_A = f + \Delta f$ while side 96 has a grating with spacial frequency $f_B = f - \Delta f$. When a lser beam is directed at centerline 100, the light pattern on photodetector 106 is shown in FIG. 7. The light pattern consists of a first spot 108 and a second spot 110. Spots 108 and 110 represent the first order diffracted beam from sides 96 and 98, respectively, with the zero order beam being to the right of photodetector 106 of FIG. 7.

Figure 7A:
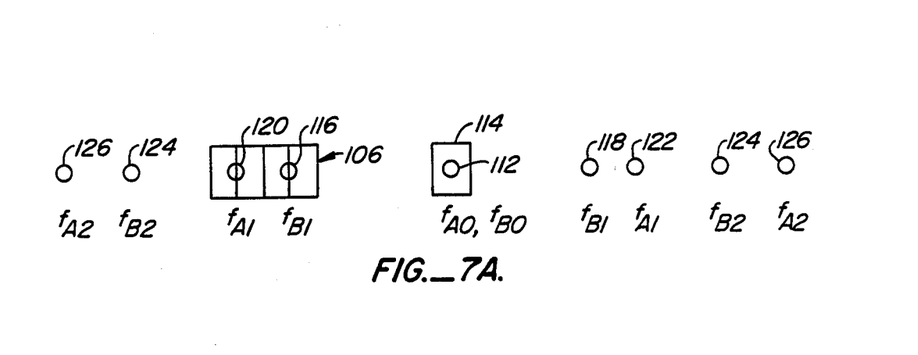

This diffraction pattern can be seen more clearly in FIG. 7A. The zero order beam from both the left side of the grating 98 having the spacial frequency $f_A$ and the right side of the grating 96 having the spacial frequency $f_B$ shows up as a spot 112 on laser 114. Because $f_B$ is a lower spacial frequency (larger spacings, or period) than $f_A$, its first order diffraction beams will show up on either side of the zero order beam at a closer distance to the center as spots 116, 118, respectively. Spot 116 is focused on photodetector 106. Similarly, the first order diffraction beam for side 98 at frequency $f_A$ shows up as spots 120 and 122. The second order diffraction beams produce spots 124 and 126, respectively, from the right and left sides of hologram lens 94. The zero order beam, the right side first order beam and all the high order beams are not used.

Optical detector 106 of FIG. 7 contains four separate photodetectors A, B, C and D. The focus and tracking can be monitored by comparing the signals detected by photodetectors A, B, C and D. When the distance between medium 78 and the objective lens increases beyond the focus distance, spot 108 will move from detector B to detector A, and spot 110 will move from detector C to detector D. Similarly, when medium 78 moves closer to the objective lens than the focal distance, spot 108 will move from detector A to detector B and spot 110 will move from detector D to detector C. Accordingly, the focus error signal is generated by $(A-B)+(D-C)$.

The sideways movement of the objective lens relative to the medium away from the tracking groove will be indicated by the modulation of the reflected beams. This modulation is a variation in brightness which will affect one of spots 108 or 110 before it affects the other of spots 108 or 110. Accordingly, the tracking error signal is generated by $(A+B)-(C+D)$. This signal will show any difference between the brightness of the two spots.

The detection of data is done by comparing the total brightness of the two beams for spots 108 and 110 or $A+B+C+D$, to a referenced threshold indicating the difference between a pit and a land.

Figure 8:
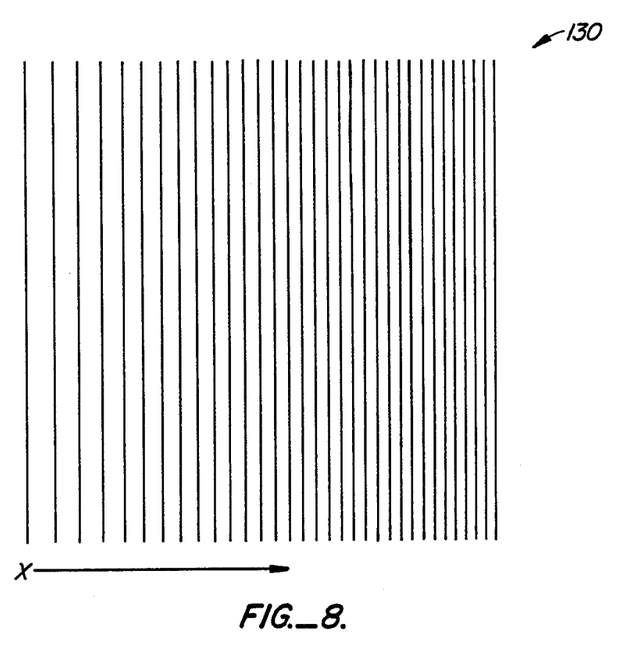
FIG. 8 is a diagram of an astigmatic hologram lens having parallel, straight fringes according to the present invention.

FIG. 8 shows a linear spacial frequency grating in which the spacial frequency increases as a function of X. The position of the fringes is given by:

$$x = Ak \cdot n^{\frac{1}{2}}$$

Where
$n = N_1, N_1+1, N_1+2, \ldots, N_2$.
$A$ = constant

Figure 9A:
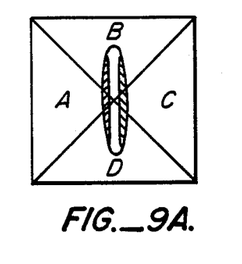
FIGS. 9A, 9B and 9C are diagrams of three focus conditions of a laser beam from the hologram lens of FIG. 8 imposed upon a four-quadrant photodetector according to the present, invention.
Figure 9B:
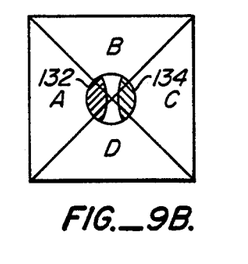
Figure 9C:
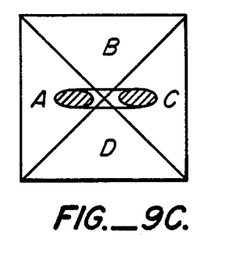

The nonuniform spacing of the fringes creates an astigmatic aberration in the diffracted beams. The beam produced by this grating is shown in FIGS. 9A–9C, with FIG. 9B showing the beam in its best focus, FIG. 9A showing the beam out of focus when the medium is too close to the lens and FIG. 9C showing the beam out of focus when the medium is too far from the lens. The best focus of FIG. 9B is also called the circle of least confusion. FIG. 9B also shows overlapping beams 132 and 134 which are produced by the grating effect of the grooved structure of the medium. The beam will be on track when beams 132 and 134 are of equal brightness, thus the tracking error signal is given by A−C. The focus error signal can be determined by noting that detectors B and D receive more light than detectors A and C in the out-of-focus condition of FIG. 9A, while detectors A and C receive more light in the out-of-focus condition of FIG. 9C. Accordingly, the focus error signal is given by (A+C)−(B+D).

Figure 10:
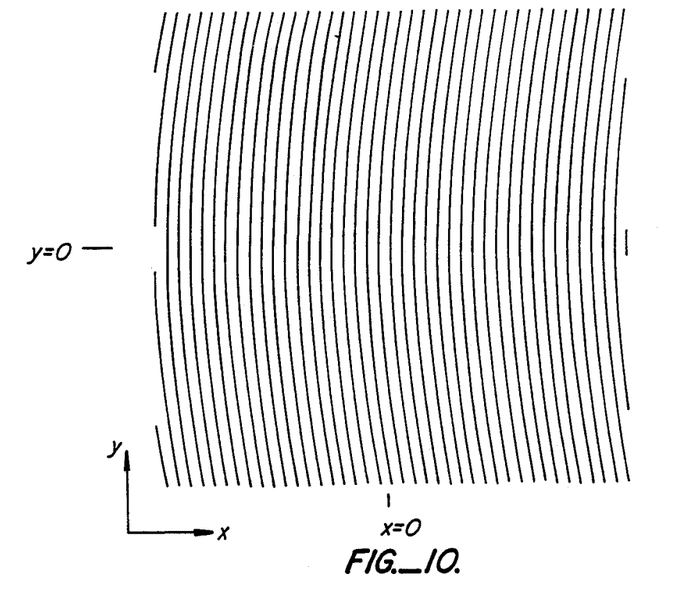
FIGS. 10 and 11 are diagrams of alternate configurations of astigmatic hologram lenses having parallel, curved fringes and nonparallel, curved fringes, respectively.

FIG. 10 shows another astigmatic grating which has an identical effect on a beam of light as the grating of FIG. 8. The position of the fringes of FIG. 10 is given by:

$$x = n^*T + B^*y^2$$

Where
n=0, 1, 2, ..., N;
T is the spacing between the lines;
B is a constant; and
y is a coordinate perpendicular to x.

Figure 11:
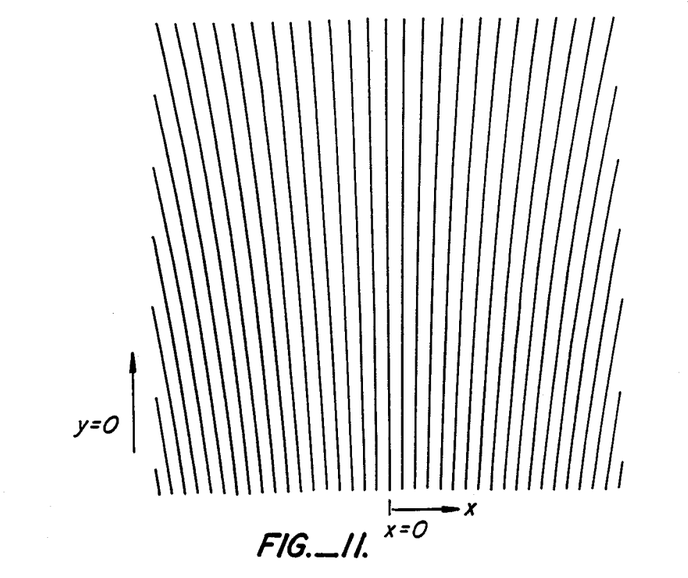

FIG. 11 is another version of an astigmatic grating having astigmatic focal lines oriented at 45° with respect to the axis of the grating. The position of the fringes is given by the following equation:

$$x = n^*T/(1 + C^*y)$$

Where
n = −N, −N+1, ..., N−1, N;
C is a constant; and
T is the grating period (line spacing).

Figure 12A:
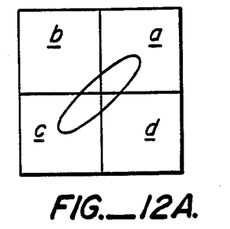
FIGS. 12A-12C show the pattern produced by the lens of FIG. 11 in three different focal planes.
Figure 12B:
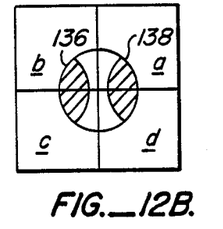
Figure 12C:
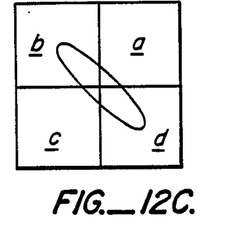

The light pattern produced by the diffraction grating of FIG. 11 shown in FIGS. 12A−12C, with the best focus being shown for FIG. 12B. As can be seen, the astigmatic focal lines have been rotated by 45° relative to the pattern shown in FIGS. 9A−9C. This orientation puts the tracking signal pattern of beams 136 and 138 in a better position with respect to the photodetectors. As can be seen from FIG. 9B, beam 132 was partially in detectors A, B and D with beam 134 bring partially within detectors D, B and C. In FIG. 12B, beam 136 is wholly contained within detectors B and C and beam 138 is wholly contained within detectors A and B, thereby eliminating overlap on the detectors. The tracking signal is thus given by (A+D)−(B+C). The focus error signal is given by (A+C)−(B+D).

The functions of the hologram lens are not restricted to those listed above. A hologram lens can generally be made to perform the functions of lenses of any kind. In particular, a hologram lens can be used for (a) beam-splitting, (b) focus error signal generation, (c) changing the focal point of a beam and (d) compensating for (or creating) off-axis aberrations such as astigmatism or coma (which may be caused by a collimating lens). By changing the focal point of the return beam, it can be made to focus on a photodetector which is in front of the laser source.

These functions of the hologram are determindd by the lines or fringes placed on the hologram lens. The general formula for these fringes is given by the following equation:

$$2\pi X/T + \theta(x,y) = 2N\pi$$

where
N=a series of negative and positive integers (typically −800 to +800);
T=the period of the grating; and
$\theta(x,y)$=a phase function of x,y.

The period T is chosen to cause the 1lst order diffracted beam to hit the photodetector according to the equation:

$$T = \lambda Fc/ds$$

where
$\lambda$=wavelength of the laser beam;
Fc=distance from the hologram lens to the laser or the focal length of the collimating lens when the hologram is placed after the collimating lens; and
ds=distance between the laser and the photodetector.

The series of integers N, when plugged into the equation, will give values of the x and y coordinates which define the fringes of the hologram lens.

The phase function can be any number of functions or combinations of functions. For example, a phase function according to the following equation could be used:

$$\theta(X,Y) = \sigma(x^2+y^2)/\lambda x^2/\lambda Fa + 2\pi xy/\lambda f$$

where
Fa=astigmatism of collimating lens
F is defined by the equation $$1/(Fc-d) - 1/Fc = 1/F$$

where
Fc=focal length of the collimating lens or, where no collimating lens is used, the physical distance between the laser source and the hologram lens; and
d=distance between the laser source and the photodetector along the optical axis.
$f = Fo^2/S$, where Fo is the focal length of the focusing (objective) lens and S is the focal error range.

The first term of the phase function example above is used to focus the return laser beam on the photodetector in front of the laser source. The second term corrects for the astigmatism of the collimating lens and the third term generates the focus error signal.

Figure 13:
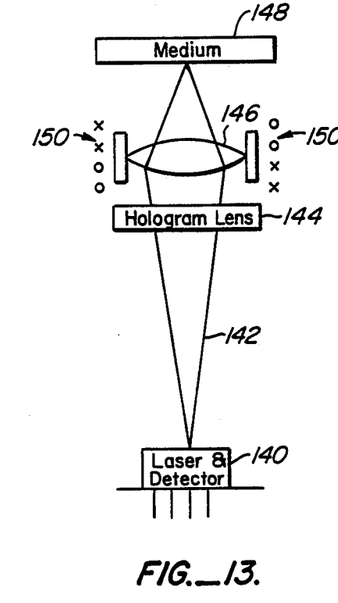
FIG. 13 is a diagram of a variation of the embodiment of the optical head of FIG. 4 without a collimating lens.
Figure 14:
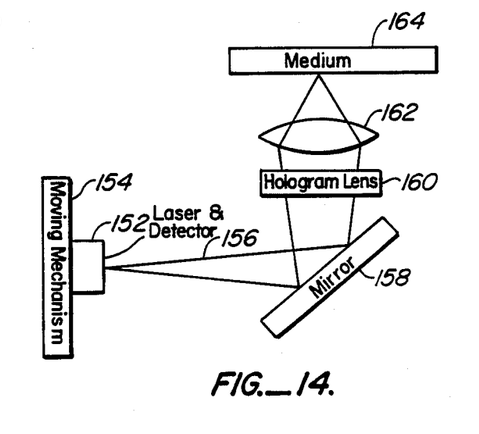
FIG. 14 is a diagram of an optical head according to the present invention utilizing an angled mirror.

FIG. 13 shows another embodiment of an optical head according to the present invention in which a collimating lens has been eliminated. A laser diode and detector 140 produces a laser beam 142 which passes through a hologram lens 144 and an objective lens 146. The beam is imaged by objective lens 146 onto a medium 148. On the return path, the reflected beam has one of its first order diffraction beams imaged on the detector portion of the laser diode and detector 140. An actuator 150 is used to move objective lens 146 in response to focus and tracking error signals. This embodiment represents a trade-off between the modularity of the embodiment of FIG. 4 and the elimination of the need for a collimating lens. FIG. 14 shows another embodiment of an optical head according to the present invention. A laser diode and detector 152 is mounted on a moving mechanism 154. A laser beam 156 is reflected off of a mirror 158 which is at a 45° angle relative to laser diode and detector 152. The beam passes through a hologram lens 160 to an objective lens 162 which focuses the beam on a medium 164. On the return path, hologram lens 160 produces a first order diffracted beam which is reflected off mirror 158 and impinges upon the detector portion of laser diode and detector 152. This embodiment allows focusing to be done by moving objective lens 162 closer to or farther from medium 164. Tracking errors can be corrected by moving laser diode and detector 152 sideways. Alternately, mechanism 154 can move laser diode and detector 152 towards or away from mirror 158 to perform focus correction, while objective lens 162 can be moved sideways to perform tracking error corrections.

The embodiments shown in FIG. 4 and FIG. 13 can be used as magnetic optical heads when they are constructed with a semiconductor laser/detector device containing polarizers (see FIG. 4 of copending application No. 858,411).

Figure 15:
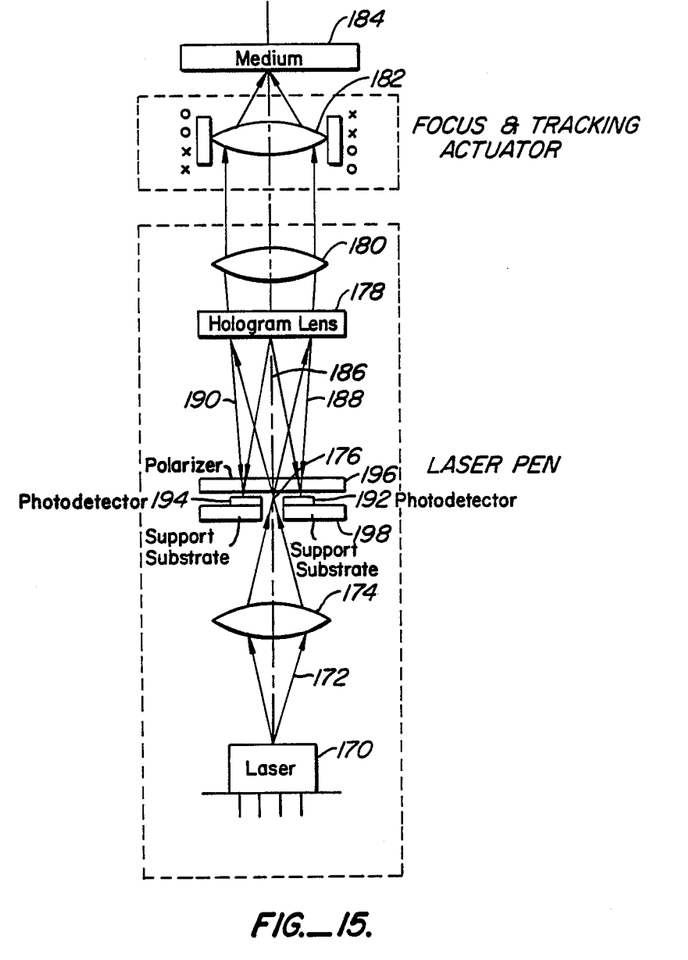
FIG. 15 is a diagram of a second preferred embodiment of the present invention using a photodetector at a intermediate focal point of the souree laser beam.

FIG. 15 shows another thermal magnetic optical head for use with a thermal magnetic medium. A semiconductor laser 170 produces a laser beam 172 which is imaged by a lens 174 to a focal point 176. After converging on focal point 176, the laser beam again diverges and passes through a hologram lens 178 to a collimating lens 180. Collimating lens 180 produces a parallel beam of light which is imaged by an objective lens 182 onto a medium 184. All of the elements of the optical head are aligned along a single optical axis 186.

Upon a return path, a reflected beam off of medium 184 passes through objective lens 182 and collimating lens 180 to diffraction grating 178, preferably a hologram lens. A pair of 0th order diffracted beams 188, 190 are focused upon a pair of photodetectors 192, 194, respectively. Diffraction grating 178 and photodetectors 192, 194 are constructed in any of the ways previously mentioned with respect to the preceding embodiments to enable focus and tracking of the laser beam. A polarizing lens 196 is mounted imeediately in front of photodetectors 192, 194. Lens 196 is constructed, as discussed below, so that different polarizations of the beam are allowed to impinge upon photodetectors 192 and 194, respectively. Photodetectors 192 and 194 are mounted on a substrate 198 as shown in more detail in FIG. 16.

Figure 16:
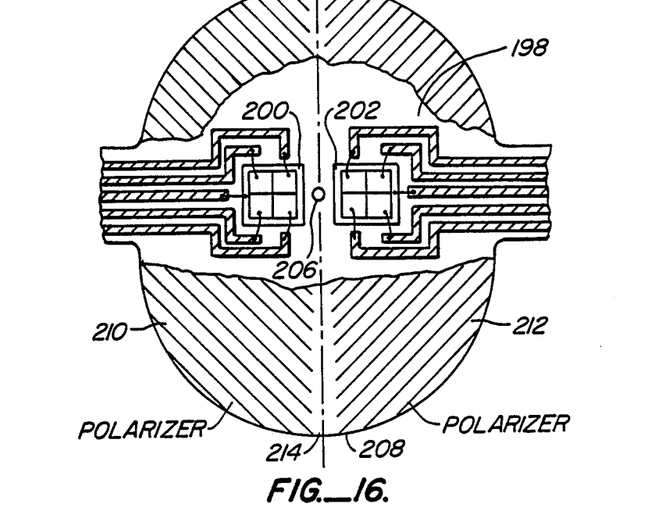
FIG. 16 is a front plan view of the photodetector and polarizer of FIG. 15.

FIG. 16 shows an embodiment of the photodetector package of FIG. 15. Two four-quadrant photodetectors 200 and 202 are shown mounted on a supporting substrate 198 which is preferably made of either ceramic material or printed circuit board material. The photodetectors are wire bonded to conducting paths 204 which provide an external co-nection to the photodetectors. The centers of the two four-quadrant detectors 200, 202 are preferably less than 5 mm from the center of the detector package. A hole 206 is provided in the center of the detector package to allow the passage of the source laser beam at focus point 176 as shown in FIG. 15. Since the image of the laser beam at this focus point, or lasing junction, is less than 3 micrometers in diameter, this defines the minimum diameter of hole 206.

A polarizer 208 is shown partially broken away in front of the photodetector package. A first side 210 of polarizer 208 in front of photodetector 200 has a series of lines which are orthogonal to a series of lines in a second portion 212 of the polarizer in front of photodetector 202. A central portion 214 of polarizer 208 has no lines at all to allow the passage of the source laser beam without polarization. The lasing junction of laser diode 170 of FIG. 15 is arranged at a 45° angle with respect to both polarization directions of portions 210 and 212. The 45° orientation improves the ability to detect the small (0.4 degree) change in polarization of the beam by putting this change in the linear region of the cosine function. This results in a detectable difference in the intensity of the beams hitiing the two photodetectors.

Figure 17:
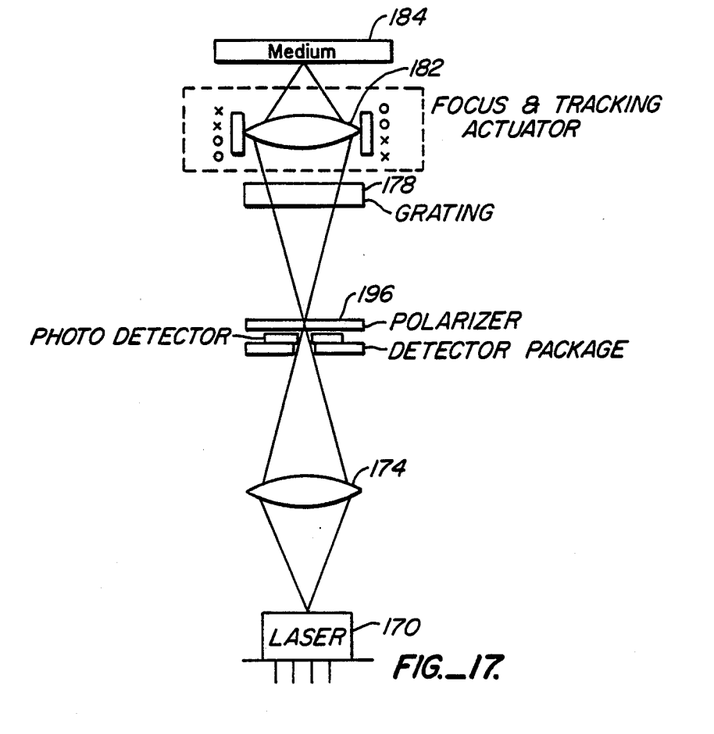
FIG. 17 is a diagram of the embodiment of FIG. 15 without the collimating lens.

FIG. 17 shows an alternate embodiment to the embodiment of FIG. 15 for a thermal magnetic optical head in which collimating lens 180 has been removed. In this embodiment, all of the elements must be precisely aligned without the margin for error allowed in FIG. 15 between collimating lens 180 and objective lens 182.

Figure 18:
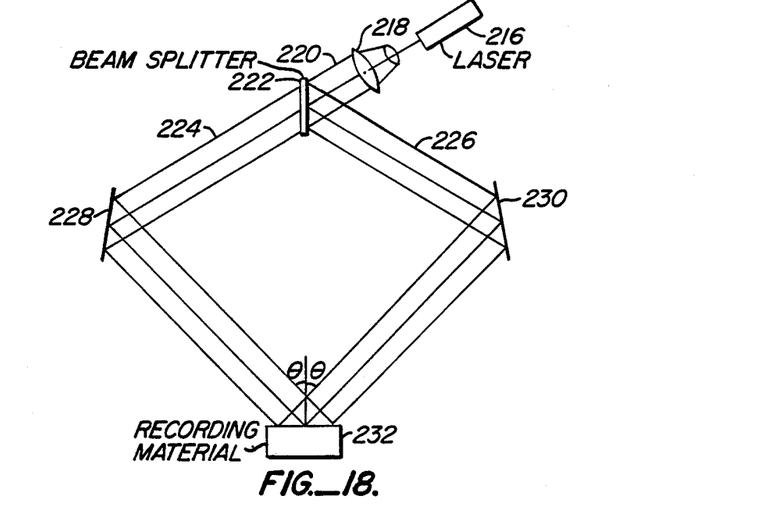
FIG. 18 is a diagram of an apparatus for producing the polarizer or FIG. 15.

FIG. 18 shows an apparatus for producing polarizer 208 of FIG. 16 as a hologram lens. It is well known in the art that light diffraction efficiency is sensitive to the polarization of the incident light. Herwig Kogelnik discussed this effect in his paper "Coupled Wave Theory for Thick Hologram Gratings," published in *The Bell System Technical Journal*, volume 48, number 9, pp. 2909–2946, November 1969. A more recent work on a similar topic is a paper entitled "Grating Efficiency Theory as it Applies to Blazed and Holographic Grating" by E. G. Loewen, M. Neviere and D. Maystre, published in Applied Optics, volume 16, number 10, pp. 2711–2721, Oct. 1977. This polarization effect becomes very strong when the grating period is less than the wavelength of light.

FIG. 18 shows an arrangement for producing polarizer 208 of FIG. 16. A laser source 216 preferably has a wavelength below 520 nm. A laser with this wavelength is used to produce a polarizer for an optical head laser with a wavelength between 0.78 micrometers and 0.85 micrometers. The wavelength is selected so that a diffraction grating can be recorded on commercially available photoresist materials. With a shorter wavelength the grating period formed on the diffraction grating can be made smaller than the near infrared wavelength of semiconductor lasers.

The laser beam from laser source 216 is passed through a collimater 218 to produce a collimated beam 220 which passes through a beam-splitter 222 to produce a pair of collimated beams 224 and 226, respectively. The expanded, collimated beams preferably have a diameter of approximately 15 mm. Beams 224 and 226 are then reflected off of mirrors 228 and 230, respectively, towards recording material 232. Each of the expanded laser beams hits medium 232 at an angle $\theta$ to a vector normal to the recording surface of medium 232. The interference pattern of the two intersecting laser beams will produce a series of lines which form the fringes of the hologram lens. The preferred process differs from the process discussed in the background section because no metal is deposited. Instead, the glass is etched to produce a relief pattern of a series of grooves on the glass. Since all portions of the hologram lens are thus transparent, its efficiency is much greater than a lens using a series of metal lines which block a portion of the light.

The distance between the lines, or the grating period, is $d = \lambda/2 \sin \theta$, where $\lambda$ is the wavelength of a laser source 216. For a laser source wavelength of 488 nm and an angle $\theta$ of 20°, the grating period will be approximately 0.71 micrometer.

Figure 19:
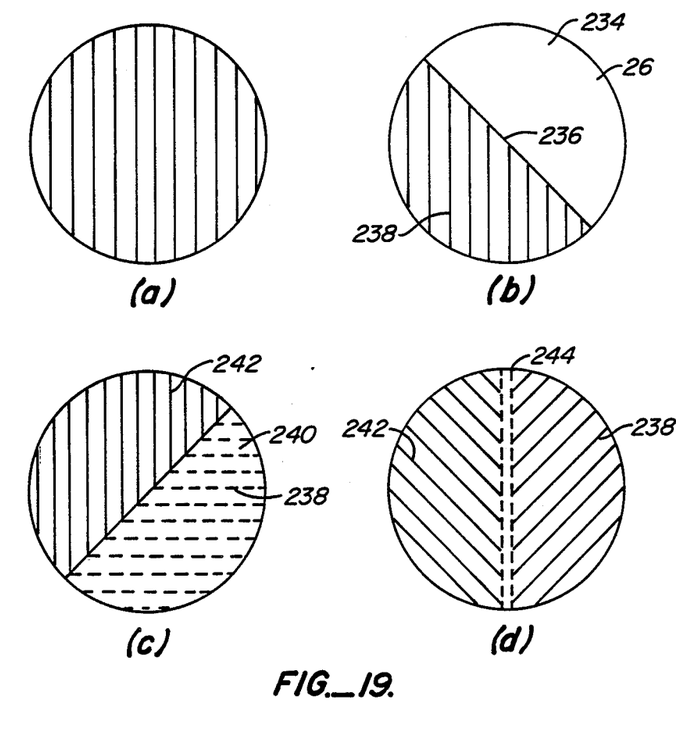
FIGS. 19A-D are diagrams of the polarizer of FIG. 15 during various stages of its manufacture with the apparatus of FIG. 18.

FIG. 19A shows the grating lines which can be formed by suc a process. The parallel lines of FIG. 19A are the fringes formed by the interference of the laser beams as shown in FIG. 18. To manufacture a polarizer 208 as shown in FIG. 16, a little more than one-half of the polarizer medium is covered by a mask 234 as shown in FIG. 19B. This mask is arranged so that its boundary 236 is at a 45° angle to the fringes 238 which are produced by the interference pattern of the laser beams. Atter this first set of fringes 238 are formed, mask 234 is removed and a mask 240 is placed over the fringes 238 as shown in FIG. 19C. This mask extends beyond the fringes 238 so that it covers more than half of the recording medium. The recording medium is rotated by 90° and a separate set of fringes 242 are formed on the second half of the medium. The resultant polarizer is shown in FIG. 19D as having a series of fringes 238 on a first side which are orthogonal to a second set of fringes 242 on a second side, with a central portion 244 of the polarizer having no fringes at all. This central portion of the polarizer allows the passage of the source laser beam without polarization.

The relief pattern formed on photoresist on the recording medium can be replicated by an embossing process. This makes mass production of the polarization elements possible at low cost for use in the thermal magnetic optical head according to the present invention. Such a phase diffraction grating has an advantage in terms of light diffraction efficiency over wire grid polarizers because the entire polarizer is transparent as discussed above.

As will be understood by those familiar with the art, the present invention may be embodied in other specific forms without departing from the spirit or essential characteristics thereof. For example, a different pattern could be embodied on the hologram lens to produce an image for focus and tracking error detection. In the embodiment of FIG. 15, the polarizer could be placed on the other side of diffraction grating 178 or collimating lens 180 and diffraction grating 178 could be interchanged. Accordingly, the disclosure of the preferred embodiments of the invention is intended to be illustrative, but not limiting, of the scope of the invention which is set forth in the following claims.

What is claimed is:

1. An optical head for reading information recorded on a reflective medium, comprising:
   semiconductor laser means for radiating a source laser beam;
   a diffraction grating disposed between said laser means and said medium to produce a diffracted beam from a reflected beam of said laser off said medium, said reflected beam and said source beam being aligned along a single optical axis, said diffracted beam having an optical axis inclined relative to said optical axis of said source beam and said reflected beam;
   photodetector means for detecting said diffracted beam, said photodetector means being positioned to intercept said diffracted beam; and
   a lens positioned to produce a focus of said source laser beam at a focus point between said laser means and said diffraction grating, said photodetector means being in substantially the same plane, normal to said source beam optical axis, as said focus point.

2. The optical head of claim 1 wherein said photodetector means comprises at least two semiconductor photodetectors positioned on opposite sides of said laser beam, said photodetector means being arranged to allow the passage of said laser beam through its center.

3. The optical head of claim 2 wherein said photodetector means defines a hole through its center for the passage of said laser beam.

4. An optical head for reading information recorded on a reflective thermal magnetic medium, comprising:
   semiconductor laser means for radiating a source laser beam;
   a diffraction grating disposed between said laser means and said medium to produce a diffracted beam from a reflected beam of said laser off said medium, said reflected beam and said source beam being aligned along a single optical axis, said diffracted beam having an optical axis inclined relative to said optical axis of said source beam and said reflected beam;
   photodetector means for detecting said diffracted beam, said photodetector means being positioned to intercept said diffracted beam; and
   a polarizer positioned on an opposite side of said photodetector means from said laser means.

5. The optical head of claim 4 wherein said polarizer comprises a diffraction grating having a spacing between lines less than the wavelength of said laser beam.

6. The optical head of claim 5 wherein said polarizer diffraction grating is a holographic grating.

7. The optical head of claim 6 wherein said holographic grating polarizer includes substantially transparent grooves.

8. The optical head of claim 4 further comprising a collimating lens positioned on an opposite side of said photodetector means from said laser means.

9. The optical head of claim 4 further comprising an objective lens positioned on an opposite side of said photodetector means from said laser means for focusing said laser beam onto said medium.

10. The optical head of claim 9 wherein said objective lens is movable only along said optical axis of said source beam.

11. The optical head of claim 4 wherein said photodetector means comprises four independently readable photodetectors.

12. The optical head of claim 4 wherein the lines of said diffraction grating are shaped so that said diffracted beam focuses in a different plane normal to said source beam optical axis than a plane containing said laser means.

13. The optical head of claim 1 wherein a plurality of lines in said grating are arranged to produce an astigmatic image from said diffracted beam.

14. The optical head of claim 13 wherein said photodetector means comprises four independently readable photodetectors, each of said photodetectors being disposed in a separate quadrant.

15. The optical head of claim 4 wherein a spacing of lines in said grating is a first value on a first side of said grating and a second value on a second side of said grating so that first and second diffracted beams having different angles of diffraction are produced by said first and second sides, respectively.

16. The optical head of claim 15 wherein said photodetector means comprises four, substantially parallel, independently readable photodetectors.

17. An optical head for reading information recorded on a reflective medium, comprising:
   semiconductor laser means for radiating a source laser beam;
   a different grating disposed between said laser means and said medium to produce a diffracted beam from a reflected beam of said laser off said medium, said reflected beam and said source beam being aligned along a single optical axis, said diffracted beam having an optical axis inclined relative to said optical axis of said source beam and said reflected beam;

photodetector means for detecting said diffracted beam, said photodetector means being positioned to intercept said diffracted beam, said photodetector means comprising first and second photodetectors positioned on opposite sides of said semiconductor laser means; and first and second holographic grating polarizers positioned between said first and second photodetectors, respectively, and said medium, said first polarizer being oriented at an angle of approximately +45° with respect to the polarization of said laser beam and said second polarizer being oriented at an angle of approximately −45° with respect to the polarization of said laser beam.

18. An optical head for reading information recorded on a reflective medium, comprising:

semiconductor laser means for radiating a source laser beam;

a diffraction grating disposed between said laser means and said medium to produce a diffracted beam from a reflected beam of said laser off said medium, said reflected beam and said source beam being aligned along a single, first optical axis, said diffracted beam having a second optical axis inclined relative to said optical axis of said source beam and said relected beam;

photodetector means for detecting said diffracted beam, said photodetector means being positioned to intercept said diffracted beam;

an objective lens positioned between said diffraction grating and said medium for focusing said source laser beam on said medium, said objective lens and said diffraction grating being aligned along said first optical axis, said laser means being aligned at an angle to said axis; and a mirror for reflecting said source laser beam from said laser means to said objective lens and for reflecting said diffracted beam from said diffraction grating to said photodetecting means.

19. An optical head for reading and writing information recorded on a thermal magnetic medium, comprising:

semiconductor laser means for radiating a source laser beam;

a hologram lens positioned between said laser means and said medium for producing first and second diffracted beams from a reflected beam of said source laser beam off said medium, said reflected beam and said source beam being aligned along a single optical axis, said iffracted beams having optical axes inclined relative to said source beam and reflected beam optical axis;

a pair of photodetectors position to intercept said diffracted beams; and a polarizer positioned immediately adjacent said photodetectors between said photodetectors and said hologram lens, said polarizer being a hologram lens with a line spacing less than a wavelength of said laser beam, a first set of lines positioned to intercept said first diffracted beam being orthogonal to a second set of lines positioned to intercept said second diffracted beam.

20. An optical head for reading and writing information recorded on a thermal magnetic medium, comprising:

semiconductor laser means for radiating a laser beam;

a first lens positioned to produce a focus of said laser beam at a focus point;

a hologram lens positioned opposite said laser means from said focus point to produce first and second diffracted beams from a reflected beam of said laser off said medium, said diffracted beams having optical axes inclined relative to an optical axis of said reflected beam;

a photodetector device positioned at said focus point, said device including a planar substrate positioned perpendicular to said laser beam, said substrate defining a hole for said laser beam to pass through, and a pair of semiconductor photodetectors mounted on said substrate on opposite sides of said hole and positioned to intercept said first and second diffracted beams, respectively; and a polarizer positioned between said hologram lens and said photodetector device, said polarizer being a hologram lens having a line spacing less than the wavelength of said laser beam, a first set of lines being arranged to intercept said first diffracted beam and a second set of lines being perpendicular to said first set of lines and positioned to intercept said second diffracted beam, a central positionoof said polarizer being free of lines to allow the passage of said laser beam without polarization.

* * * * *